US008065554B2

(12) United States Patent
Herscovitz et al.

(10) Patent No.: US 8,065,554 B2
(45) Date of Patent: Nov. 22, 2011

(54) COMMUNICATION DEVICE AND A METHOD OF SELF-HEALING THEREOF

(75) Inventors: Eli Herscovitz, Kochav Yair (IL); Irit Rapaport, Givataim (IL)

(73) Assignee: Gryphonet Ltd., Kochav Yair (IL)

( * ) Notice: Subject to any disclaimer, the term of this patent is extended or adjusted under 35 U.S.C. 154(b) by 163 days.

(21) Appl. No.: 12/307,423

(22) PCT Filed: Jul. 5, 2007

(86) PCT No.: PCT/IL2007/000839
§ 371 (c)(1),
(2), (4) Date: Jan. 5, 2009

(87) PCT Pub. No.: WO2008/004233
PCT Pub. Date: Jan. 10, 2008

(65) Prior Publication Data
US 2009/0204845 A1    Aug. 13, 2009

Related U.S. Application Data

(60) Provisional application No. 60/818,511, filed on Jul. 6, 2006, provisional application No. 60/879,797, filed on Jan. 11, 2007.

(51) Int. Cl.
*G06F 11/00* (2006.01)
(52) U.S. Cl. .................. 714/4.1; 714/2; 714/4.3; 714/25
(58) Field of Classification Search .................. 714/2, 4, 714/25, 4.1, 4.3, 4.4; 455/425
See application file for complete search history.

(56) References Cited

U.S. PATENT DOCUMENTS

| 5,706,278 | A | 1/1998 | Robillard et al. |
| 5,809,220 | A | 9/1998 | Morrison et al. |
| 6,192,402 | B1 | 2/2001 | Iwase |
| 6,215,994 | B1 | 4/2001 | Schmidt et al. |
| 6,442,694 | B1 | 8/2002 | Bergman et al. |
| 6,549,771 | B2 | 4/2003 | Chang et al. |

(Continued)

OTHER PUBLICATIONS

"Developer's Guide for Windows Mobile-Based Smartphones;" http://msdn.Microsoft.com/library/default,asp?url=/library/en-us/DevGuideSP/html/Dev_Guide_for_Windows_Mobile-Based_Smartphones.asp.

(Continued)

*Primary Examiner* — Robert Beausoliel, Jr.
*Assistant Examiner* — Joseph D Manoskey
(74) *Attorney, Agent, or Firm* — Merchant & Gould P.C.

(57) ABSTRACT

Provided a communication device and a method of self-healing thereof. The communication device is characterized by one or more operational functions and comprising one or more resources operatively coupled to at least one sensor, said sensor directly or indirectly coupled to a recovery block, wherein the device is configured to held an emergency configuration related to at least one of said operational functions and/or at least one of said resources; the sensor is configured to monitor at least one of said resources for information, indicative of at least one possibly malfunctioned resource, and to report, directly or indirectly, this information and/or derivative thereof to the recovery block; and the recovery block is configured to initiate at least one remedial action in respect of at least one of said resources in case the received information and/or derivative thereof meets a certain criterion, wherein said remedial action to be provided in accordance with the emergency configuration.

52 Claims, 9 Drawing Sheets

U.S. PATENT DOCUMENTS

| | | | |
|---|---|---|---|
| 6,553,515 B1 * | 4/2003 | Gross et al. | 714/25 |
| 6,625,420 B1 | 9/2003 | Naqvi et al. | |
| 7,240,245 B2 | 7/2007 | Maxwell et al. | |
| 2004/0153823 A1 * | 8/2004 | Ansari | 714/38 |
| 2005/0064847 A1 | 3/2005 | Kirbas et al. | |
| 2005/0079863 A1 | 4/2005 | Macaluso | |
| 2006/0230312 A1 * | 10/2006 | Nichols et al. | 714/25 |
| 2007/0180287 A1 * | 8/2007 | Kumar et al. | 714/4 |
| 2008/0005609 A1 * | 1/2008 | Zimmer et al. | 714/5 |

OTHER PUBLICATIONS

"Smartphone Developer's Guide;" http://msdn.Microsoft.com/embedded/windowsce.default.aspx.

* cited by examiner

COMMUNICATION DEVICE AND A METHOD OF SELF-HEALING THEREOF

FIELD OF THE INVENTION

This invention relates to communication devices and, in particular, to methods and systems for fault management of the communication devices operating.

BACKGROUND OF THE INVENTION

Contemporary communication devices are changing from single function devices to integrated open platforms that combine voice, data and video and enable to download and run different types of software applications. Typically, such communication devices contain operating systems with well documented Application to Program Interfaces (APIs) which set the ground for many developments of different types of applications, from firmware modules and extensions to the operating system to software and high-level java applications. This is farther supported with multiple communication channels with higher bandwidth that enable quick software download. These changes present new requirements for fault management of the communication device operating. Fault management comprises a set of functions related to detecting, localizing/correcting and reporting malfunctions. The functions may include, for example, carrying out sequences of diagnostics tests, correcting faults, reporting error conditions, maintaining and examining error logs, accepting and acting on error detection notifications, tracing and identifying faults, etc.

The problem of fault management of the communication device operating has been recognized in Prior Art and various systems have been developed to provide a solution.

SUMMARY OF THE INVENTION

The inventors' analysis of nature of communication devices and the need for service continuity and availability has resulted in the requirement for auto-diagnostic of malfunction(s) following by remedial action(s) aimed at keeping, at least, emergency performance of the communication device. Typically, the successful remedial actions facilitate to keep substantially uninterrupted emergency performance and enable further recovery and/or repairing to be provided. There is also a need in a remediation process provided with no escalation (auto-remedial actions) or with minimal escalation to resources external to the communication device (as, e.g., network-based servers, synchronization with Personal Computer, customer service personal, etc.). The auto-remedial actions may be provided, when possible, as a part of an auto-recovery process (provided with no escalation to external resources).

The malfunction may be, for example, a result of miss-configuration, improper memory usage or other problems related to software downloading (e.g. a problem in a new version of an operating system, game, corporate application, etc.), corruption of operating system, interoperability problems and/or internal "bugs" of one or more applications, etc. The malfunction can interrupt the operation of the communication device or even totally disable its voice, data and/or video functionalities. In many cases the communication device under malfunction conditions will not be able to communicate with external servers, for example in order to send an alert, get software patches or fixed software modules, etc. Accordingly, for a communication device comprising a remote management agent there is also a need to keep such agent alive, thus enabling further remote repairing of the malfunctioned communication device.

In accordance with certain aspects of the present invention, there is provided a communication device characterized by one or more operational functions and comprising one or more resources operatively coupled to at least one sensor, said sensor directly or indirectly coupled to a recovery block, wherein the device is configured to hold an emergency configuration related to at least one of the operational functions and/or at least one of the resources; the sensor is configured to monitor at least one of said resources for information, indicative of at least one possibly malfunctioned resource, and to report, directly or indirectly, this information and/or derivative thereof to the recovery block; and the recovery block is configured to initiate at least one remedial action in respect of at least one of the resources in case the reported information and/or derivative thereof meets a certain criterion, wherein said remedial action to be initiated and/or provided in accordance with the emergency configuration. The resources include one or more functional elements of the communication device; one or more functional paths of the communication device; one or more applications of the communication device; operating system of the communication device; and/or execution environment and/or one or more processes thereof etc. At least one remedial action may be provided in respect of at least one resource other than possibly malfunctioned resource.

In accordance with further aspects of the present invention, at least one remedial action is aimed to keep the emergency performance of the device.

In accordance with further aspects of the present invention, at least one resource is a remote device management agent and at least one remedial action is aimed to keep said agent alive.

In accordance with further aspects of the present invention, the emergency configuration comprises one or more pre-defined remedial actions to be provided by the recovery block in respect of a certain resource in a case of a certain malfunction.

In accordance with other aspects of the present invention, there is provided a method of keeping an emergency performance of at least one resource of the communication device in a case of malfunction, the method comprising arranging emergency configuration of the communication device, said configuration comprising information related to one or more resources involved in the emergency performance; diagnosing at least one malfunctioned resource involved in the emergency performance; and providing at least one auto-remedial action in response to said diagnosing and in accordance with said emergency configuration.

In accordance with other aspects of the present invention, there is provided a method of applying a remedial action related to at least one resource of a communication device involved in an emergency performance of the communication device, the method comprising monitoring said at least one resource for information, indicative of possible malfunction of the resource, and reporting this information and/or derivative thereof within the communication device; and, in response to the reporting, initiating at least one auto-remedial action in respect of said at least one resource or parts thereof in case the reported information and/or derivative thereof meets a certain criterion.

In accordance with other aspects of the present invention, there is provided a method of keeping an emergency performance of a communication device, said device characterized by one or more operational functions and comprising one or more resources, the method comprising arranging emergency configuration of the communication device, said configuration comprising information related to at least one of said operational functions and/or at least one of said resources; monitoring one or more resources for information, indicative of one or more possibly malfunctioned resources, and reporting this information and/or derivative thereof within the communication device; and, in response to said reporting, initiating at least one remedial action in respect of at least one resource of the communication device in case the reported information and/or derivative thereof meets a certain criterion, wherein the remedial action is initiated and/or provided in accordance with the emergency configuration.

In accordance with further aspects of the present invention, at least one of the remedial actions is aimed to facilitate managing the communication device via a remote device management agent. In accordance with further aspects of the present invention at least one of the remedial actions is provided in respect of a resource other than the malfunctioned resource, said resource may be involved or may be not-involved in the emergency performance.

In accordance with other aspects of the present invention, there is provided a communication device comprising one or more resources operatively coupled to at least one sensor, said sensor directly or indirectly coupled to a recovery block, wherein said resources comprise at least one remote device management agent; the sensor is configured to monitor at least one of said resources for information, indicative of at least one possibly malfunctioned resource, and to report, directly or indirectly, this information and/or derivative thereof to the recovery block; and the recovery block is configured to initiate at least one remedial action in respect of at least one of said resources in case the reported information and/or derivative thereof meets a certain criterion, wherein said remedial action to be provided is aimed to keep performance of said remote device management agent.

In accordance with other aspects of the present invention, there is provided a method of keeping an emergency performance of a communication device, said device comprising one or more resources, including at least one remote device management agent, the method comprising monitoring one or more resources for information, indicative of one or more possibly malfunctioned resources, and reporting this information and/or derivative thereof within the communication device; and, in response to the reporting, initiating at least one remedial action in respect of at least one resource of the communication device in case the reported information and/or derivative thereof meets a certain criterion, wherein the remedial action is aimed to keep performance of said remote device management agent.

In accordance with other aspects of the present invention, there is provided a system coupled through a communication network to the provided communication device comprising the remote device management agent, wherein the system is configured to communicate with said remote device management agent.

In accordance with other aspects of the present invention, there is provided a method of keeping alive at least one remote device management agent comprised in a communication device, said device comprising one or more resources, including the remote device management agent, the method comprising: monitoring one or more resources for information indicative of one or more possibly malfunctioned resources, and reporting this information and/or derivative thereof within the communication device; and, in response to the reporting, initiating at least one remedial action in respect of at least one resource of the communication device in case the reported information and/or derivative thereof meets a certain criterion, wherein the remedial action is aimed to keep performance of said remote device management agent.

In accordance with other aspects of the present invention, there is provided a service of keeping alive at least one remote device management agent comprised in a communication device, said device comprising one or more resources including said remote device management agent; the service comprising: facilitating monitoring one or more resources for information, indicative of one or more possibly malfunctioned resources, and reporting this information and/or derivative thereof within the communication device; and facilitating initiating at least one remedial action in respect of at least one resource of the communication device in case the reported information and/or derivative thereof meets a certain criterion, wherein the remedial action is aimed to keep performance of said remote device management agent.

Among advantages of certain aspects of the present invention is the ability to facilitate an immune system that will automatically recognize a malfunction and/or the malfunctioned resources and provide automatic or user controlled remedy and/or recovery. This immune system will make the communication device capable of functioning (at least, in emergency mode) with no need of knowing a reason or root-cause of the malfunction. This immune system will also keep alive the remote device management agent thus enabling further remote repair of the communication device.

It should be noted that the invention is not limited in its application to the details set forth in the summary.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF CERTAIN EMBODIMENTS

Figure 1A:
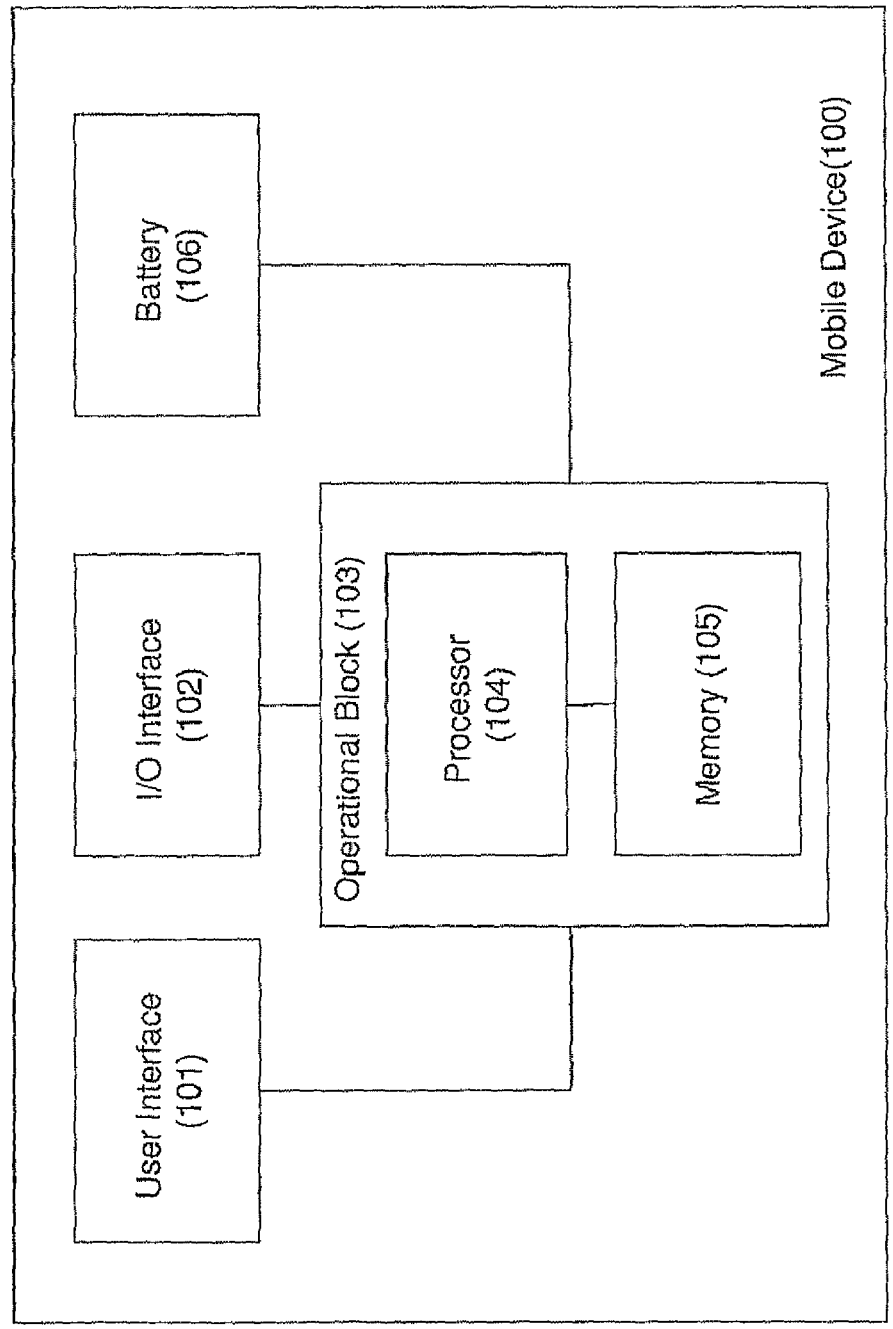
FIGS. 1a and 1b illustrate schematic block diagrams of typical communication devices as known in the art.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention.

In the drawings and descriptions, identical reference numerals indicate those components that are common to different embodiments, configurations and/or forms of presentation.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or processor, or similar electronic and/or optical computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, flash memory (e.g. Disk-on-Key, memory card), smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being operatively coupled to a computer system bus.

The processes/devices (or counterpart terms specified above) and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "communication device" used in this patent specification should be expansively construed to include any kind of customer premises equipment (CPE) with communication capabilities, including those adapted for coupling with voice, data, video and/or multimedia terminals. The communication devices include fixed and mobile terminals, cellular phones, IP phones, multimedia devices (e.g. for streaming audio, video and TV), personal and other computers, pagers, radio telephones, cordless telephones, dedicated data units (e.g. PDA), Global Positioning System (GPS) devices, TV-remote control devices, wireless information devices (e.g. car control computers, remote security units, industrial processes control units, remote monitoring units, etc.), wireless adapter devices, play stations, etc. It includes devices able to communicate using any kind of wireline or wireless communication infrastructure (e.g. radio, cable, PSTN, etc.) and protocols (e.g. GSM, CDMA, TDMA, GPRS, UMTS, EvDo, DoP, Bluetooth, WiFi, WiMax, Infra-Red, etc.) and variants of evolution thereof. The communication device may communicate, directly or indirectly, with other devices via all possible communication networks such as, e.g. cellular networks, broadband networks, fixed line network, data communication networks, Internet network, etc. using any standard or proprietary protocols supporting communication. The communication device may implement any conventional or specialized operating system, for example, mobile communication devices may implement Symbian OS™, Palm™ OS, Windows® CE, Windows® Mobile, EPOC, Mobile Linux, Danger™ Hiptop® OS, Blackberry® OS, proprietary operating systems of cellular handsets (e.g. by Nokia, Samsung, and others), etc.

The communication devices (e.g. used in GSM, 2.5 G/GPRS, 3 G/UMTS, DECT, etc.) may further contain smart cards (e.g. subscriber identity element (SIM), functional chip cards, memory cards, etc.).

The term "criterion" used in this patent specification should be expansively construed to include any compound criterion, including, for example, several criteria and/or their combination.

The term "malfunctioned resources" used in this patent specification should be expansively construed to include any resources or combination thereof indicated to be malfunctioned in accordance with received information (and/or derivatives thereof) and/or supposed to be malfunctioned in accordance with certain rules.

The term "malfunction" used in this patent specification should be expansively construed to include any improper function and/or failure to function of at least one resource of a communication device caused by any known or unknown reason with or without known intention to be harmful to the communication device and/or its resources. The malfunction may be caused by software bugs, authorized or non-authorized download of corrupted or improper configured applications and/or operating system, other configuration problems caused by authorized or non-authorized actions, incompatibility with the hardware, operating system or other programs, applications that are "heavy" consumers of resources (e.g. memory, processing) that are either not available or the usage of such resources by one application may interrupt other programs or applications, malware, etc.

The term "remedial action" used in this patent specification should be expansively construed to include any action aimed at keeping, at least, emergency performance of the communication device, wherein the emergency performance is characterized by a certain (predefined and/or configurable) set of one of more functions and said set of functions and/or characteristics thereof are reduced compared to a regular state of operation. The remedial actions are not aimed at fixing (repair) the communication device, although they may result in a repair. Typically, the successful remedial actions facilitate to keep substantially uninterrupted emergency performance and enable further recovery and/or repairing to be provided.

The term "recovery" used in this patent specification should be expansively construed to include any return of the communication device to a regular state of operation. The recovery is not aimed at fixing (repair) the communication device, although it may result in a repair. A recovery process may involve one or more remedial actions followed, when necessary, by further recovery actions or all recovery actions may be implied regardless the emergency configuration.

The terms "repair" or "fix" used in this patent specification should be expansively construed to include any action aimed at substantially eliminating the root-cause of a malfunction in the communication device.

The term "resource" used in this patent specification should be expansively construed to include any functional element of a communication device (including hardware, software, firmware and/or combination thereof), any combination of the functional elements and links thereof, (e.g. functional paths); any application comprising at least one process to be executed and utilizing at least one of the functional elements, and any other facility of a communication device (e.g. operating system, execution environment for application, control, processing or other programs; data sets; files; libraries; etc.) required for its operation, administration and/or maintenance.

The term "sensor" used in this patent specification, should be expansively construed to cover any kind of software, hardware, or/and firmware, and/or combinations thereof capable of active and/or passive monitoring the communication device and/or, at least, one of its resources for information possibly indicative of malfunctioned resources.

Bearing this in mind, attention is drawn to FIG. 1a illustrating a schematic block diagram of a typical communication device 100 as known in the art. Typical communication device 100 accommodates at least one resource.

Referring to FIG. 1a, the communication device 100 comprises several functional elements: a user interface 101, an input/output interface 102, an operational block 103, a processor 104, a memory 105 and a battery 106, The operational block 103 is operatively coupled to a user interface 101 and to the input/output interface 102. The battery 106 feeds the communication device including corresponding functional elements and a processing thereof. The user interface 101 contains (or is functionally associated with) a display and means for user's input (e.g. keyboard, touch screen, control buttons, etc.). The input/output interface 102 is configured for transmitting/receiving signals to/from different external devices (e.g. external servers, PCs, other communication devices, etc.). The operational block 103 is capable of managing and controlling the operations and features associated with the communication device, for example, signal transmitting/receiving, signal processing, voice and data communication, user interface support, etc. The operational block contains the processor 104 coupled to the memory 105. Generally, an operating system is run by the processor 104 from the memory 105. The communication device 100 is capable of requesting and receiving downloads such as, for example, software programs, files, upgrades, e-mails, etc. from an external server.

Figure 1B:
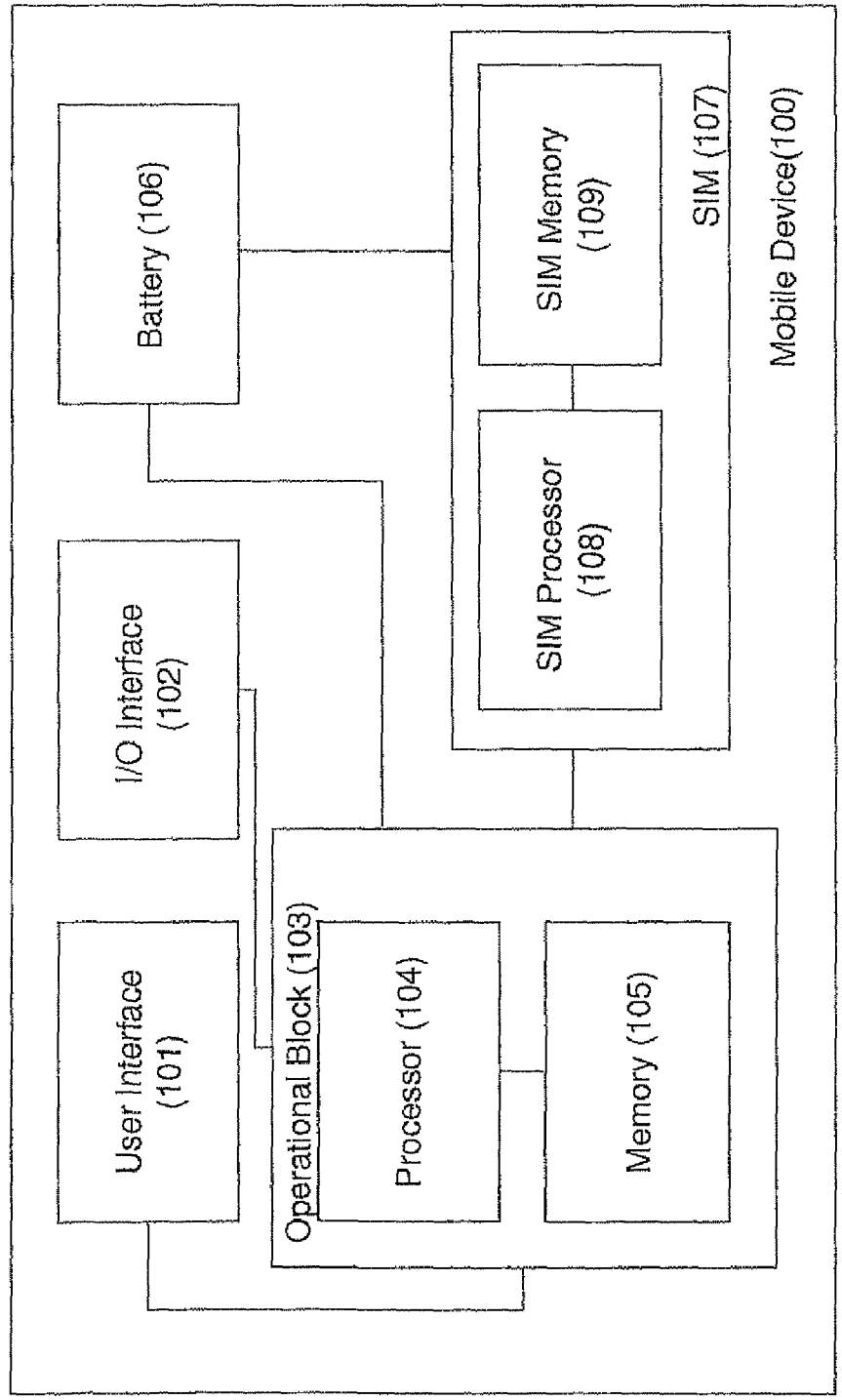

Referring to FIG. 1b, there is illustrated a schematic block diagram of a specific type of communication device known in the art; namely, the communication device further containing such functional element as a smart card (e.g. SIM, functional chip cards, etc.). The illustrated communication device contains Subscriber Identity Module (SIM) 107 operatively coupled to the operational block 103, SIM 107 contains SIM memory 109 operatively coupled with SIM processor 108. Typically, SIM 107 contains user's related information, including user's and device's identification information, personalized settings, phone book, etc.

Both, memory 105 and/or SIM memory 109 may contain firmware and/or software (e.g. application software, maintenance software, etc.) that are either provided during a manufacture process or later downloaded from an external server owned, for example, by manufacturer, by wireless service provider, by 3$^{rd}$ party, etc.

The functional elements may be combined in one or more functional paths as, for example, voice call path, messaging path (e.g. SMS), data path (e.g. GPRS, UMTS), input from keypad path, output to display path, etc. The functional path comprises one or more operatively connected functional elements (including interfaces thereof combined to facilitate and/or provide certain function. By way of non-limiting example, the voice call path in a cellular phone comprises the user interface 101 (e.g. keypad input and display output), operational block 103, Subscriber Identity Module (SIM) 107 and input/output interface 102 (e.g. for radio unit interfacing) operationally coupled in a sequential manner and enabling voice-call related flows.

It should be noted that the invention is not bound by the specific structure of the communication devices described with reference to FIGS. 1a and 1b. Those versed in the art will readily appreciate that the invention is, likewise, applicable to any other communication device.

Device illustrated with reference to FIGS. 1a and 1b may comprise such functional elements as one or more remote device management agents (not shown), for example, over-the-net (OTN) agent, over-the-air (OTA) agent as, for example, OMA (Open Mobile Alliance) DM (device management) client, FOTA (firmware update over-the-air) agent (e.g. Bitfone mProve™, Redbend vCurrent®, etc.), EFD (embedded feature delivery) clients, etc, and/or any other agent capable to support the remote device management process between a network operator and/or handset maker and the communication device. The remote device management agent may be embedded in the device core software, a middleware component, software application or otherwise.

Figure 2A:
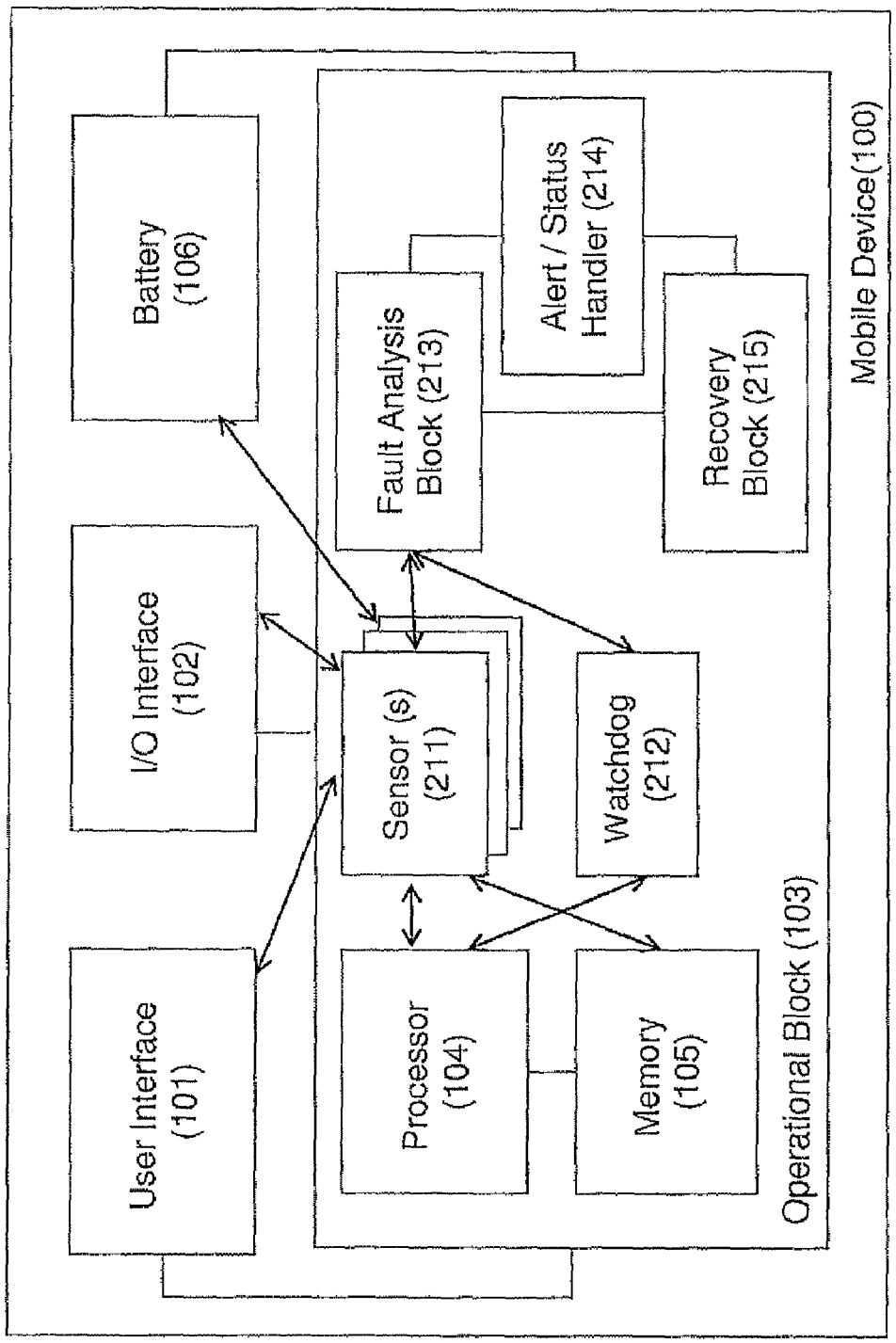
FIGS. 2a and 2b illustrate schematic block diagrams of communication devices in accordance with certain embodiments of the present invention.
Figure 2B:
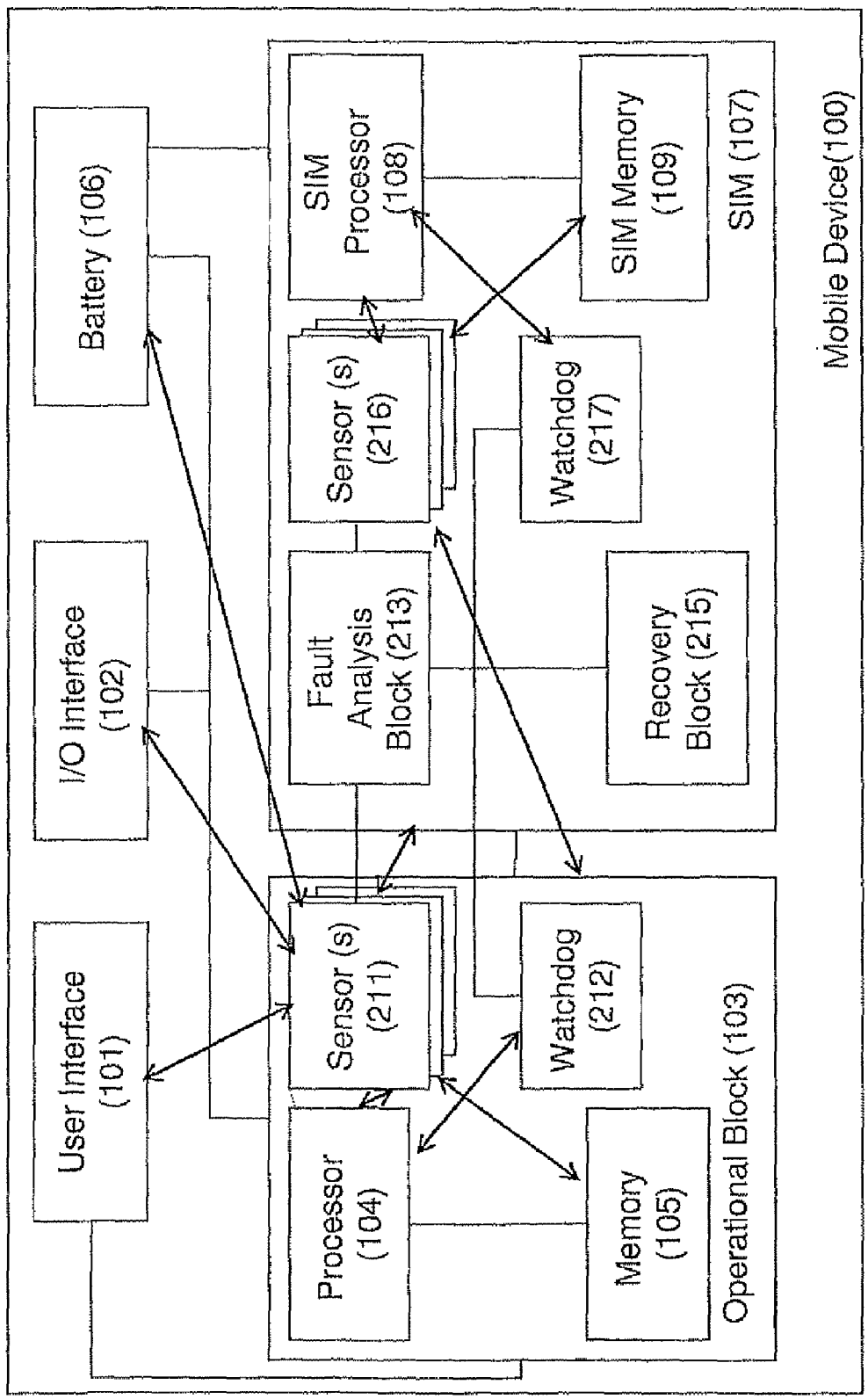

Referring to FIGS. 2a and 2b, there are illustrated schematic block diagrams of communication devices in accordance with certain embodiments of the present invention. FIG. 2a illustrates a SIM-less embodiment described with reference to FIG. 1a, while FIG. 2b illustrates an embodiment for a communication device containing SIM as described with reference to FIG. 1b.

In accordance with certain embodiments of the present invention, the communication device 100 is equipped with at least one sensor 211 and/or 216 capable of monitoring at least one resource of the communication device. Generally, the sensor is external to and/or independent from the resource it senses. Monitoring resources may be provided in several ways, some of which are known in the art as, by way of non-limiting example:

through information residing in the system (such as operating system activity tables, memory allocation table, etc.), via communication with one or more resources (e.g. functional elements) to check their status through protocol defined by the specific resource(s) and/or driver(s) thereof, by executing an operation on one or more resources (e.g. functional elements, functional paths, etc.) and analyzing the response status or other output, etc. (e.g., a sensor may send a "test signal" (like a "ping") through one or more functional paths, and accept the signal (or derivative thereof) to be received at the end of the path, within a predefined time interval.

For example, the sensors illustrated in FIGS. 2a and 2b may monitor CPU load, free memory, battery depletion rate, data transmission/receiving rates and their correlation, data integrity (e.g. by content sanity check), code integrity (e.g. by using an integrity code that was added during installation or during legitimate load to check if the content is valid), input/output rate to storage (e.g. to phone book), user interface operability (e.g. verify that the keyboard and the screen are functional and not corrupted, etc.). The sensors may, also, actively monitor resources related to an operation of the communication device and combinations thereof. For example, the sensor(s) may emulate processes and analyze respective responses with regards to certain functional paths as, by way of non-limiting example, "send" process (e.g. originating a call), "alert" process (e.g. receiving a call), originating and receiving SMS, setting up data connection, etc.

In certain embodiments of the invention a certain single resource (e.g. functional element, functional path, etc.) may be monitored by several sensors monitoring, for example, different characteristics of the functional element, different functional elements in the functional path, etc.; said sensors may monitor the resource in the same or different ways (e.g. some sensors may be active and others may be passive, etc.).

In certain embodiments of the present invention, the sensor(s) 211 and/or 216 may contain internal logical units capable of processing the received information and deciding if it meets a certain criterion of a suspicious event. Upon registration of the suspicious event (or a set of suspicious events), the sensors send the received information and/or derivatives thereof to a fault analysis block 213. A criterion of a suspicious event may contain a predefined value/range or combination thereof. For example, the criterion may be a combination of a threshold value with a certain period of time (e.g. more than 98% of the processor load for at least 2 seconds is considered a suspicious event, etc.). In certain embodiments of the present invention, the criterion may be a predefined pattern or/and predefined function to be compared with monitoring behavior characteristics from at least one sensor (e.g. a sequential spike that loads the CPU more than 90% for at least 100 milliseconds each time and repeats for at least 10 times in 30 minutes; free available memory less than 10% of the available memory for at least 100 milliseconds each time and repeats for at least 10 times in 30 minutes). In certain embodiments of the present invention, a sensor monitoring a functional element may be aware of an application and/or process running in connection with the block. For example, a sensor monitoring the processor may be also aware of running applications (e.g. games, video, etc.). If a functional path and/or functional elements thereof are monitored by more than one sensor, in certain embodiments of the present invention one of said sensors may obtain information from the others, process the received information and take the decision with regards of a suspicious event related to the functional path. It should be noted that a functional path may be malfunctioned even if all comprised functional elements are operating properly (e.g. because of problems related to one or more links between elements).

In different embodiments of the invention, upon registration of suspicious behavior, the sensors may send to the fault analysis block at least one of the following content:
  a) all data received from a monitoring resource(s) and meeting the certain criterion,
  b) filtered or processed data received from a monitoring resource(s) and meeting said criterion,
  c) notification of each suspicious event,
  d) notification of a certain suspicious event and/or certain set of suspicious events,
  e) others may also apply.

The fault analysis block 213 is configured to aggregate and analyze information received from several sensors in order to identify the malfunction event and the malfunctioned resources (e.g. to analyze information received from sensors monitoring different resources in order to identify a malfunction, etc.). The analysis of the aggregated information is also helpful for preventing false positive reaction and for defining the severity of the problem. Not every suspicious event shall be identified as a malfunction event requiring remedial action(s). For example, running of processor-consuming application (e.g. video) may be a legitimate reason of the processor overload recognized as a suspicious event, but not as a malfunction event. The fault analysis block may contain a pre-defined criterion/pattern for identification of a malfunction event. In certain embodiments of the invention, the fault analysis block may also be configured to provide correlation analysis of data received from different sensors or another adaptive mechanism of malfunction event identification. The correlation analysis of received data may include analysis for predefined states, per predefined rules, and/or per predefined relationships, etc., and may include identification of patterns, common causes, root causes, etc. The fault analysis block 213 may also have capabilities of learning the monitoring behavior of the communication device and fitting and/or modifying certain criterion accordingly.

The sensors may send information and/or derivatives thereof for further analysis, decision(s) and/or action(s) constantly, periodically, on-request and/or if a predefined event occurs (i.e. when received information and/or derivates thereof meet a certain criterion of suspicious behavior).

In certain embodiments of the invention, the mode of communication between a sensor and the fault analysis block may be configurable and may be different for different sensors or for the same sensor. For example, if sensor A sends to the fault analysis block information about a suspicious event (e.g. about suspicious depletion rate of the battery, high continuous transmission rate, etc.), in order to verify the malfunction event, the fault analysis block may request another sensor(s) (e.g. sensor B) for information (e.g. which applications are being run by the processor). In this case sensor B will send the information per request, and not in response to a suspicious event registered by this sensor.

In certain embodiments of the present invention, the sensors (or some of them) may be implemented with no logical capabilities; and the fault analysis block may be configured to analyze the information received (either in pull or push mode) from the sensors also in order to define suspicious events.

The fault analysis block is operatively coupled with a recovery block 215 capable of facilitating at least one remedial action.

In certain embodiments of the present invention, the fault analysis block is optional and the sensors (or some of them) may send information directly to the recovery block. The functionality of the fault analysis block may be divided (partly or entirely) between the sensors and the recovery block or may be not implemented. The operation of the recovery block will be further detailed with reference to FIG. 4.

In certain embodiments of the invention, the fault analysis block 213 and/or recovery block 215 are operatively coupled to an alert/status handler 214. Upon identification of malfunction event, the fault analysis block forwards the information to the alert/status handler which is configured to send an alert via at least one of different types of media available to the communication device under conditions of current malfunction. The alerts may be sent to predefined external system(s) (e.g., management system, central monitoring device, etc.) in a format matching the system and may contain notification and/or information about the malfunction event. In certain embodiments of the present invention the alert/status handler may also contain an information log (not presented in FIGS. 1 and 2). In certain embodiments of the present invention, the information log may be also located in the memory 105 or in the SIM memory 109 or be distributed between different elements.

In certain embodiments of the invention, the sensors may also comprise a WatchDog 212. The term WatchDog used in this patent specification, should be expansively construed to cover any kind of software, hardware, firmware and/or combinations thereof operatively connected to a processor and capable of registering the processor malfunctions resulting in stop-responding. The WatchDog senses periodically the operation of the processor and its operating system, and/or the processor and/or applications running on the processor through signals sent periodically to the WatchDog. If the WatchDog doesn't receive this signal within the set period of time, it will initiate immediate remediation-related activities such as, for example, reset the system and/or restore configuration. The WatchDog may also report the failure to the fault analysis block 213 which initiates additional remedial activities subject to the fault analysis results. In certain embodiments of the invention, if the WatchDog doesn't receive said signal within the set period of time, it may just report to fault analysis block and/or recovery block 215 for further actions.

Attention now is drawn to FIG. 2b illustrating, by way of non-limiting example, certain embodiments of the present invention for use in a SIM-comprising communication device. In the illustrated embodiment, the SIM 107 contains sensor(s) 216 (including WatchDog 217 operatively connected with the SIM processor 108). The sensors 216 are configured to monitor SIM processor 108, SIM memory 109 and overall operational block 103 (e.g. activity of the operating system). The sensors 211 are configured to monitor also SIM 107.

Those skilled in the art will readily appreciate that the invention is not bound by the configuration of FIGS. 2a and 2b; equivalent and/or modified functionality may be consolidated or divided in another manner. The present invention may be implemented for communication devices comprising single CPU or multiple CPUs. The present invention may be implemented for SIM-comprising communication devices in a manner illustrated for SIM-less communication devices, Also the present invention may be implemented for the communication devices comprising other than SIM smart cards in a manner described in the reference to SIM-comprising communication devices.

In certain embodiments of the present invention, at least part of the remediation initiating functionality may be also implemented within the sensors. The sensors may contain remediation script associated with and triggered by certain suspicious events or combinations thereof. In such a case, when the event occurs, the script operates.

Figure 3A:
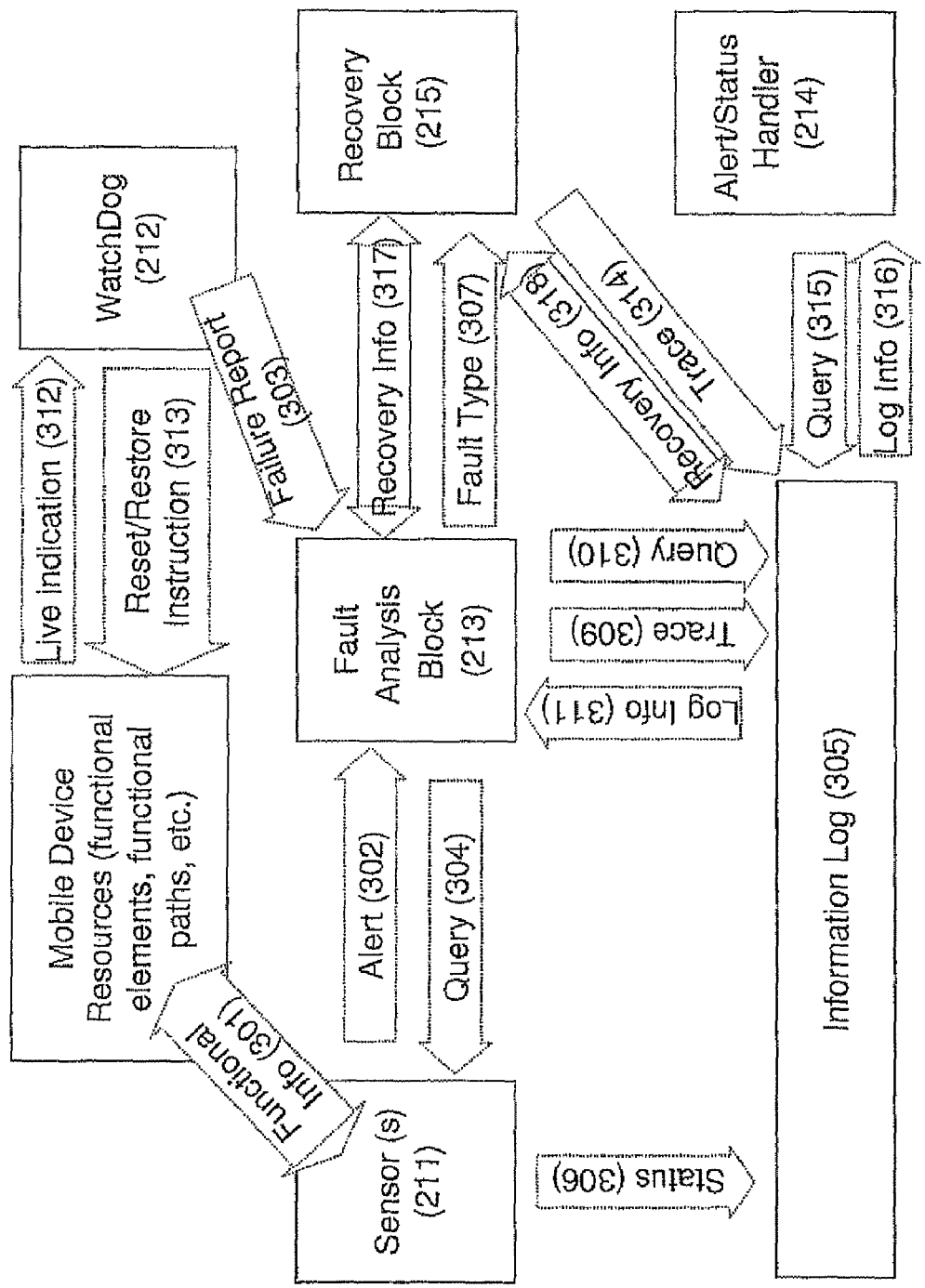
FIG. 3a illustrates a generalized diagram of operational interfaces in accordance with certain embodiments of the present invention.

Referring to FIG. 3a, there is illustrated a non-limiting example of a generalized diagram of operational interfaces in accordance with certain embodiments of the present invention.

The sensor 211 interfaces one or more monitoring resources (e.g. element(s) and/or combination(s) thereof, process(es), path(s), application(s), etc.) to receive operational information for further analysis 301. In case of a suspicious event, the sensor sends an alert 302 to the fault analysis block 213. This alert may also contain data and/or derivatives thereof sampled by the sensor. The fault analysis block may also initiate retrieving up-to-date status and sampled data and/or derivatives thereof by sending a query 304 to the sensor. The sensor may also interface the information log 305 for sending (constantly, periodically and/or per predefined criterion) the status info to be saved in the log.

The fault analysis block 213 analyzes the information received from the sensor(s) in order to define the malfunction event, its severity, malfunctioned resources and/or a type of fault, and reports 307 the results to the recovery block. The fault analysis block may use, for example, a look-up table in order to determine if and what validation operations (e.g. integrity checks, memory allocation check, etc.) are required, which resource(s) and what type of resource(s) may be malfunctioned, etc. For example, upon CPU overload, it may check which processes consume exceptionally high CPU process load. If such processes are found, it will further check if such consumption is "valid" by the specific processes. The fault analysis block also sends information to the information log 305 for tracing 309 the fault analysis operation and decisions. The fault analysis block may also send a query 310 to the log and receive corresponding information 311.

The WatchDog (212 and/or 217) continuously receives a live indication 312 from the monitoring CPU(s) and/or OS and, upon a failure (if at least one of the monitored resources is not running), sends a predefined instruction (e.g. reset/restore) 313. The WatchDog interfaces the fault analysis block 213 for sending failure reports 303; and, optionally, interfaces the recovery block 215 for sending a remediation trigger (not shown) if the remediation is to be facilitated by the recovery block.

The sensors configured to actively monitor one or more functional paths, may interface the recovery block via the fault analysis block or directly and operate in a manner similar to the WatchDog).

The recovery block 215 interfaces the fault analysis block (and, optionally, with the WatchDog(s)) for receiving the malfunction information 307; and interfaces the information log for tracing 314 the recovery decisions and operation.

The information log 305 maintains historical information on status of sensors and/or decisions and operations of the fault analysis block and the recovery block. This information may be sent to an external system by the alert/status handler. The alert/status handler 214 may also send a query 315 to the log and receive 316 corresponding information.

In certain embodiments of the invention, the recovery block 215 may also interface the fault analysis block 213 for requesting and receiving information 317 during remediation and/or recovery processes. In certain embodiments of the present invention, the recovery block 215 may request and receive information 318 for a remediation process via interface with the information log 305.

It should be noted that in certain embodiments of the invention the auto-diagnostic of malfunction detailed with reference to FIGS. 2 and 3 may be also initiated by an external factor (e.g. operator's request).

The functionality disclosed in the present invention may be implemented in several ways, for example:
  partly or entirely in hardware (e.g. ASIC—Application Specific Integrated Circuit that is designed to implement such a feature. Such ASIC may be a self-contained component or integrated into a hardware component that implements other functionalities such as a CPU, a co-processor or any other component);
  partly or entirely in software;
  partly or entirely in microcode/firmware (e.g. as a set of software instructions directly operating machine code and optimized for fast execution);
  combination of the above (e.g. some parts of the system may be implemented within CPU or other components with processing capability, e.g., ASIC; other parts may be implemented in micro-code and the rest in software as illustrated in FIG. 3b.

Figure 3B:
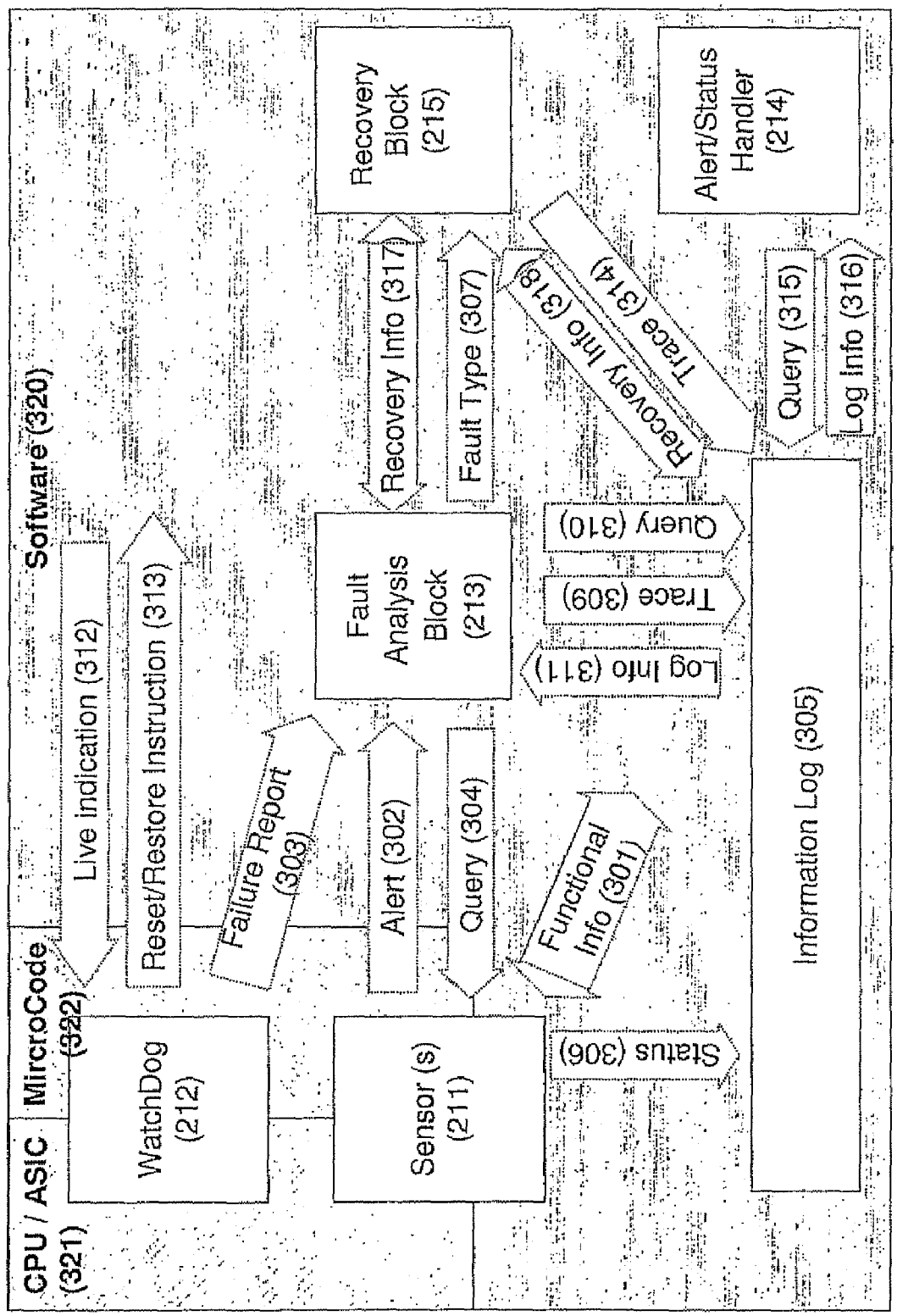
FIG. 3b illustrates the generalized diagram illustrated in FIG. 3a with exemplified implementation divided between software, firmware and hardware in accordance with certain embodiments of the present invention.

FIG. 3b illustrates the generalized diagram illustrated in FIG. 3a with exemplified implementation divided between software, firmware and hardware in accordance with certain embodiments of the present invention: some of the sensors are implemented in ASIC, the sensors are monitored and operated through interface micro-code programs, while the other blocks of the system are implemented by software. In certain embodiments of the invention the implementation of at least part of the functionalities in ASIC and/or Microcode may be provided within the main CPU, one or more peripheral components with processing capabilities, within the SIM and/or in combination thereof.

In certain embodiments of the present invention the entire functionalities or at least part thereof (e.g. one or more sensors and the recovery block) may be implemented in a chip or/and in a smart card, Said chip/smart card may constitute a part of the communication device or part of another device to be operatively coupled with the communication device.

In certain embodiments of the present invention the entire functionalities or at least part thereof (e.g. one or more sensors and the recovery block) may be implemented as a software. Said software may run on one or more resources of the communication device and/or of another device operatively coupled to the communication device.

Figure 4:
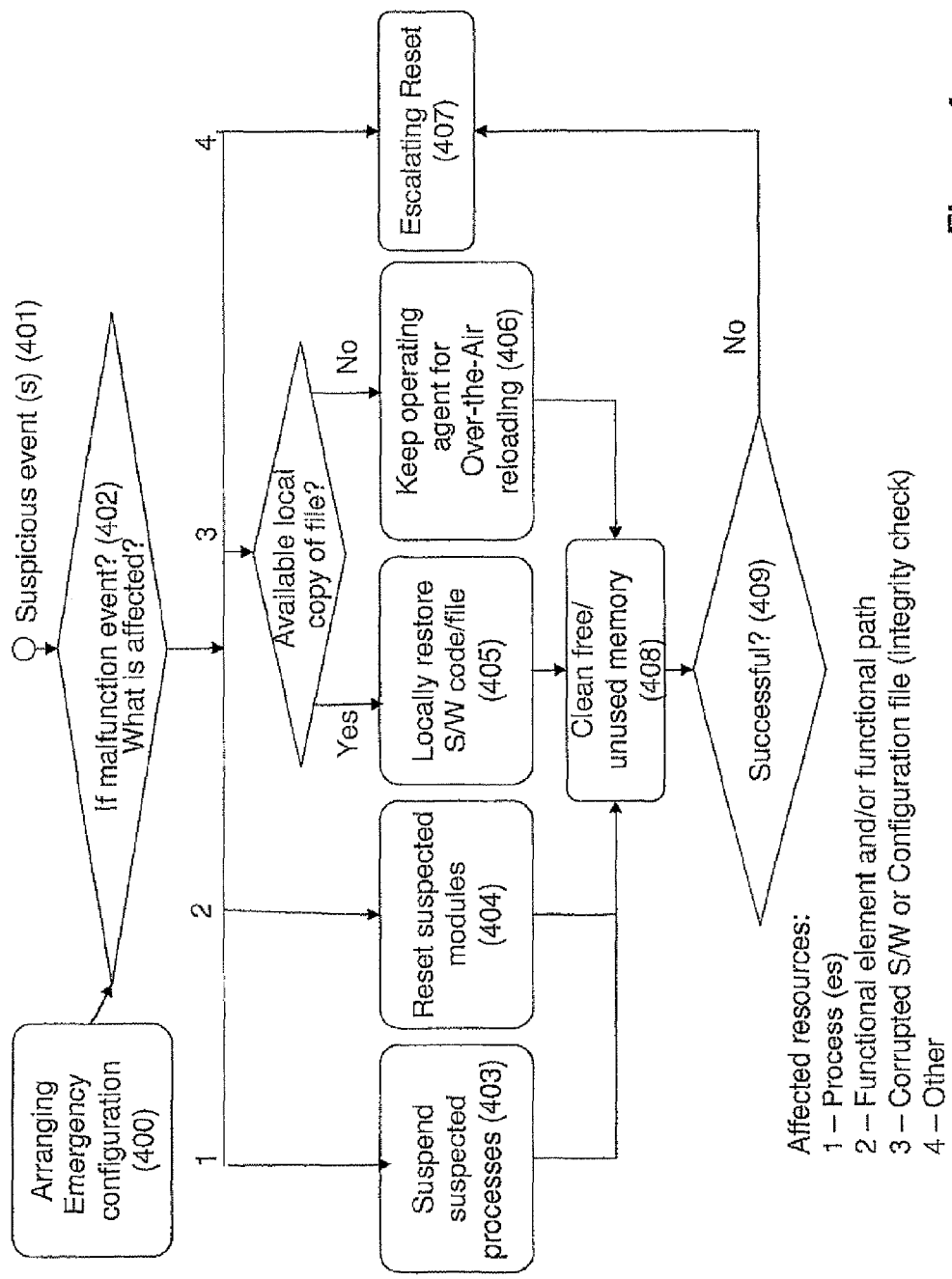
FIG. 4 is a generalized flow chart of auto-remediation steps in accordance with certain embodiments of the present invention.

Referring to FIG. 4, there is illustrated a generalized flow chart of a recovery process comprising remedial steps. In accordance with certain embodiments of the present invention, the communication device is configured 400 to accommodate information related to emergency performance, for example, what functions and what characteristics thereof need to be kept and prioritization thereof, resources to be involved in providing these functions under emergency conditions, emergency characteristics of the involved resources, resources affecting the emergency performance, etc. Such information defines the configuration of emergency performance, is referred to hereinafter as "emergency configuration", and may be accommodated, for example, in the fault analysis block and/or the recovery block, The emergency configuration may be configured by a user, operator and/or manufactory. For example, in certain embodiments of the present invention the emergency performance may be characterized by substantially non-interrupted operating at least one of the following: voice communication (e.g. voice functional path), data communication (e.g. data functional path), messaging communication (e.g. messaging functional path), an over-the-air device management (e.g. via OTA agent). Alternatively, these (or other operational functions) may be prioritized, e.g. emergency performance may be characterized by non-interrupted operating at least over-the-air device management agent (keeping the agent alive), or at least messaging communication, etc. In certain embodiments of the invention the emergency characteristics of one or more functions may differ from non-emergency characteristics thereof (e.g. voice communication quality, bandwidth for data communication, etc.). Also an emergency functional path may be identical or may differ from a regular functional path by one or more elements, links and/or characteristics thereof.

When the fault analysis block receives information on a suspicious event 401 from so the sensor(s), it checks 402 whether said event constitutes a malfunction, what resources are malfunctioning, and thereafter informs the recovery block. The information received by the recovery block is related, at least, to the resources involved in the emergency operation and/or resources affecting the emergency operation in a case of their malfunction (and some times not necessary involved in the emergency performance). For example, a process executing by a game application may overload the CPU (e.g. 90% load instead of certain expected load) thus giving a non-limiting example of a malfunctioned process possibly affecting the emergency operation although not involved therein.

The recovery block initiates remedial steps in accordance with malfunctioning resources and the emergency configuration. The emergency configuration defines also which of malfunction events require remedial actions aimed to keep, at least, emergency performance. The emergency configuration may also comprise predefined remedial actions to be provided by the recovery block in respect of certain resources in a case of certain malfunction.

The remedial actions depend on the malfunctioned resources. For example, for a case of malfunction of processes involved in the emergency performance the recovery block may initiate suspending such process(es) 403. In a case of malfunction of functional elements and/or functional paths the recovery block resets 404 the respective elements and/or combinations thereof. Depending on emergency configuration, the remedial actions may be provided also with respect to non-affected functional elements (e.g. the recovery block may reset part of or the entire functional path if at least one of the resources within the path is malfunctioned). If an operating software code (or a configuration file) is corrupted in a manner possibly affecting the emergency performance, the recovery block initiates local restore of software code or file 405, if available, or invokes a device management agent 406, in order to facilitate further over-the-air (OTA) reloading.

The OTA reloading may include, by way of non-limiting example, reloading of the communication device configuration, settings, applications software, operational system software and firmware, etc. based on different specifications, some of them known in the art, for example as standardized in OMA (Open Mobile Alliance) DM 1.2, OMA DL 1.0, FUMO 1.0, etc.; and may be implemented by using different techniques, some of them known in the art, for example as disclosed in US Patent Application No. 2005/079,863; U.S. Pat. No. 6,549,771; U.S. Pat. No. 6,215,994, US Patent Application No. 2005/064,847 and/or others.

In certain embodiments of the invention the remedial actions may be prioritized (e.g. in a case of multiple malfunctions, conflicting remedial actions, etc.), for example, actions facilitating keeping OTA agent alive may have the highest priority.

Steps 403-406 are followed by cleaning 408 free/unused memory (e.g. marking such memory as free and writing an arbitrary value to this memory) and testing 409 (e.g. by interrogating the fault analysis block or/and information log) if the malfunction has been successfully remedied in a manner, at least enabling an emergency mode of operation. If the problem still exists, the recovery block will activate 407 a process of escalating reset, further described with reference to FIG. 6 or other process of escalating extent. If the malfunctioned resources are other than a process, a functional element and/or combinations thereof, and/or corrupted software or configuration file (e.g., there are configuration problems, full memory caused by non-identified task, CPU overloaded by non-identified process, etc.) and said malfunctioning may possibly affect the emergency performance, the recovery block will activate 407 the process of escalating reset.

Figure 5:
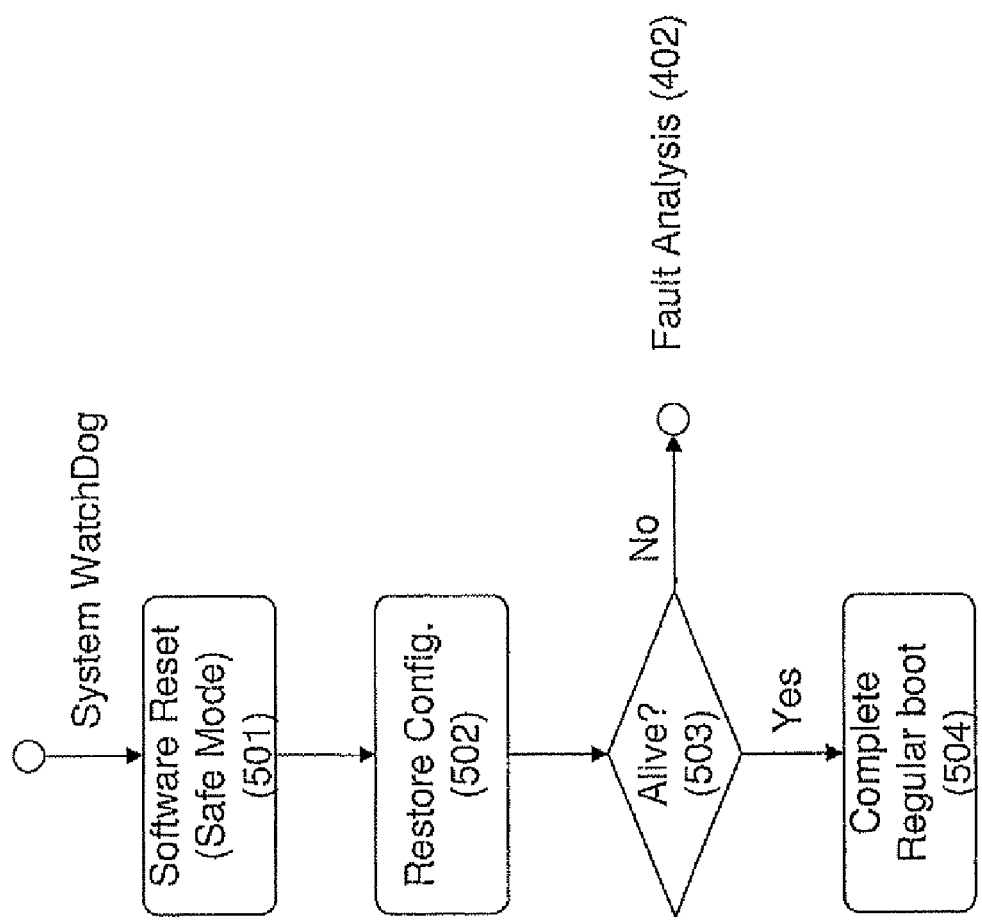
FIG. 5 is a generalized flow chart of WatchDog initiated remedial actions in accordance with certain embodiments of the present invention.

FIG. 5 illustrates a generalized flow chart of remediation initiated by the WatchDog in accordance with certain embodiments of the present invention.

If the WatchDog does not receive a live indication from the monitored CPU(s) and/or OS within a period of time defined in the emergency configuration, it will initiate software reset 501 followed by controlled and gradual rebooting of the operating system and by configuration restore 502. If later testing 503 does not provide a live indication, the WatchDog will inform the Fault Analysis Block about a suspicious event that needs to be handled in accordance with the procedure described with reference to FIG. 4. Upon success of remediation activities, the system will complete a regular boot 504.

In a similar manner the remediation may be initiated by a sensor actively monitoring a functional path for a live indication of the path. A sensor may send a "test signal" (like a "ping") through one or more functional paths, and accept the signal (or derivative thereof to be received at the end of the path, within a time interval predefined in the emergency configuration. If the sensor does not receive the signal (or derivative thereof) at the end of the path, within the predefined time interval, it will invoke the fault analysis block (213) to further analyze the malfunction event and activate the recovery block (215) accordingly.

Figure 6:
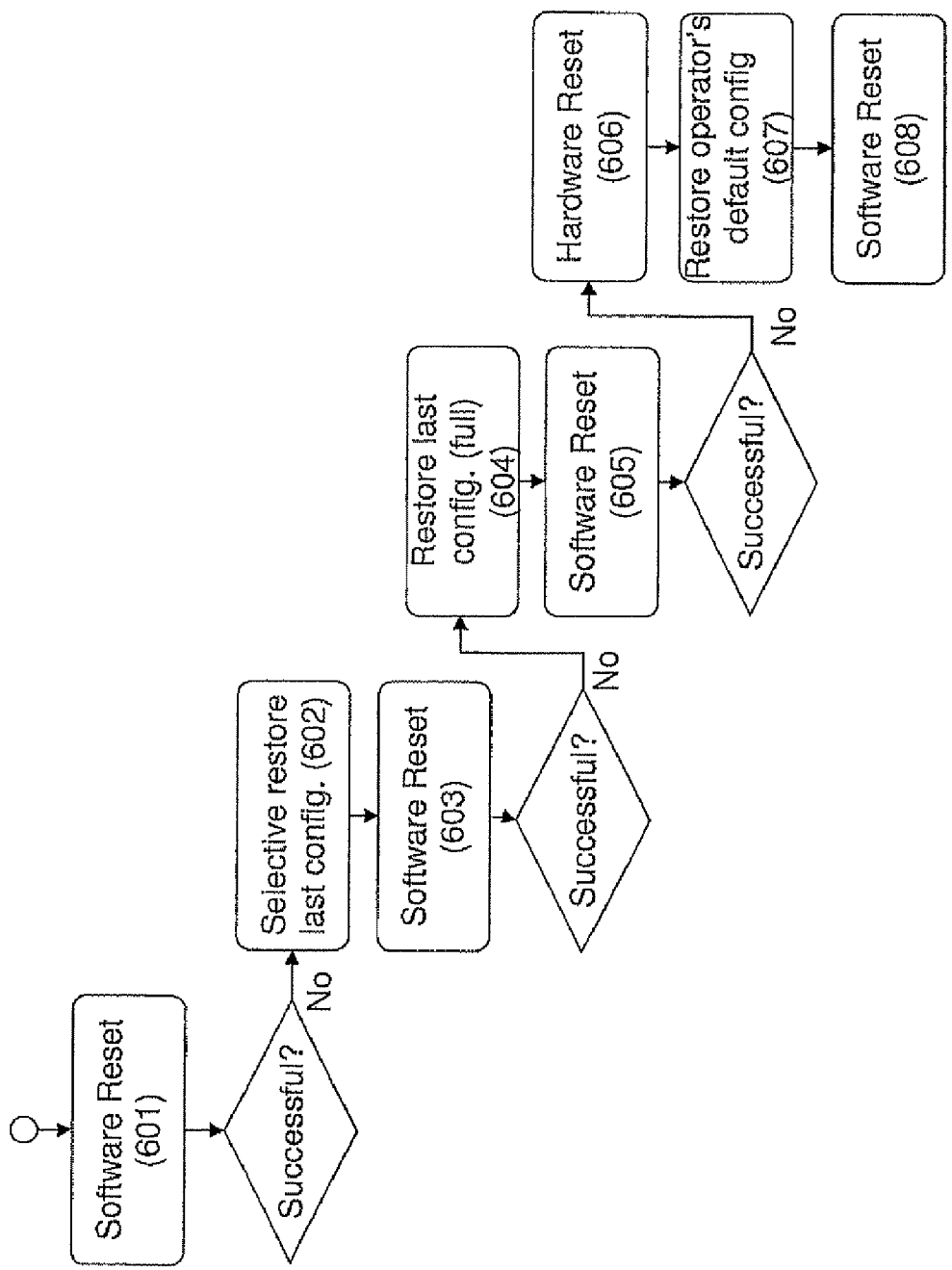
FIG. 6 is a generalized flow chart of escalating reset in accordance with certain embodiments of the present invention.

Referring now to FIG. 6, there is illustrated a generalized flow chart of escalating reset in accordance with certain embodiments of the present invention. The escalating reset is provided in accordance with emergency performance configuration. The escalating reset process starts with a software reset 601. The further escalating action is to provide a restore 604 of configuration followed by software reset 605. (Optionally, this step may be divided into several stages, for example selective restore of previous configuration (e.g. configuration of the malfunctioned modules only) 602 followed by software reset 603 and, if not successfully recovered, configuration restore of the respective functional path defined in the emergency configuration and/or full configuration restore). If the problem still exists, the next action of escalating extent is to provide hardware reset 606, restore the operator's default configuration 607 (may be provided in several stages in a manner similar to configuration restore), and followed by software reset 608.

It should be noted that the invention is not bound by the specific remedial actions described with reference to FIGS. 4-6, and other remedial actions may be pre-configured for the remediation process.

For example, the remedial actions of escalating extent may be selected from the following group, not necessary in the following escalating order:
  a) reset at least one functional element of the communication device;
  b) reset communication device software;
  c) reset communication device hardware;
  d) reboot the communication device software gradually;
  e) reboot the entire communication device software;
  f) restore a previous configuration of at least one malfunctioned resource;
  g) restore a previous configuration of all malfunctioned resources;
  h) restore a previous configuration of all resources involved in the emergency performance;
  i) restore a previous configuration of all resources;
  j) restore an emergency configuration of at least one malfunctioned resource;
  k) restore an emergency configuration of all malfunctioned resource;
  l) restore an emergency configuration of all resources involved in the emergency performance;
  m) reinstall at least one applications from a local source;
  n) reinstall at least one application from a remote source;
  o) reinstall at least one driver from a local source;
  p) reinstall at least one driver from a remote source;
  q) reinstall at least part of the operating system from a local source;
  r) reinstall at least part of the operating system from a remote source;
  s) reinstall the entire software of the communication device from a local source;
  t) reinstall the entire software of the communication device from a remote source;
  u) restore a default configuration as set by the operator of the communication device;
  v) restore user's data that is stored in the communication device (e.g. personal information module, content data, etc.); and
  w) restore user's data from a remote backup source.

Some of above escalating actions (e.g. comprising operation of reinstalling) may in certain cases lead to full repair of the communication device. Also some successful remedial actions detailed with reference to FIGS. 4-6 may be followed by further recovery actions which may lead to recovery and, in certain cases, full repair of the communication device. Said further recovery actions may be of escalating extent; likewise the remedial actions detailed with reference to these figures.

It is also to be noted that in certain embodiments of the invention each of remedial and overall recovery actions may be initiated with no involvement of any factor external to the communication device, while in other embodiments initiating at least part of said actions requires involvement of at least one external factor (e.g. for authorization, confirmation of availability, etc.), In certain embodiments of the invention at least part of remedial actions may be provided with no involvement of any factor external to the communication device.

It will also be understood that the system according to the invention, may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It is also to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the concept upon which this disclosure is based, may readily be utilized as a basis for designing other structures, methods, and systems for carrying out the several purposes of the present invention.

Those skilled in the art will readily appreciate that various modifications and changes can be applied to the embodiments of the invention as hereinbefore described without departing from its scope, defined in and by the appended claims.

The invention claimed is:

1. A communication device comprising a processor, at least one resource operatively coupled to at least one sensor, the at least one sensor coupled to a recovery block, a fault analysis block and to the processor, the fault analysis block is coupled with the recovery block, wherein:
  said at least one sensor monitoring said at least one resource for information to determine whether said information meets at least one criterion of a suspicious event that is indicative of possible malfunction of said at least one resource, said at least one sensor providing content relating to said suspicious event to said fault analysis block, said fault analysis block auto-diagnosing said content to determine if said suspicious event is to be identified as a malfunction of said at least one resource, said recovery block receiving information relating to said suspicious event identified to be said malfunction of a respective one of said at least one resource and in response, initiating at least one auto-remedial action to maintain performance of said at least one resource.

2. The communication device according to claim 1, wherein said at least one auto-remedial action is initiated with respect to said at least one resource other than that which is possibly malfunctioned.

3. The communication device according to claim 1, wherein said at least one auto-remedial action maintains an emergency performance of said communication device, wherein said emergency performance is characterized by having at least one function less, in comparison with that in a regular state of the operation of said communication device.

4. The communication device according to claim 3, wherein said at least one auto-remedial action substantially maintains said emergency performance of respective one of said at least one resource.

5. The communication device according to claim 1, wherein said at least one sensor includes a logical unit for processing said information indicative of said possible malfunction.

6. The communication device according to claim 1, wherein said communication device further comprises an alert/status handler coupled to either one of said fault analysis block and said recovery block, said alter/status handler sends an alert to at least one predefined external system, upon identification of said suspicious event to be said malfunction.

7. The communication device according to claim 6, wherein said predefined external system is selected from a management system and a central monitoring device.

8. The communication device according to claim 1, wherein said at least one criterion of said suspicious event is selected from a list consisting of:
    substantial processor load of said mobile device;
    running of a processor-consuming application on said communication device;
    a predefined pattern compared with monitored behavior characteristics by said at least one sensor;
    a predefined function compared with monitored behavior characteristics by said at least one sensor;
    a particular depletion rate of a battery of said mobile device; and
    a high continuous transmission rate.

9. The communication device according to claim 1, wherein said at least one resource is selected form a list consisting of:
    hardware of said communication device;
    software of said communication device;
    firmware of said communication device;
    functional element of said communication device;
    functional path of said communication device;
    execution environment and processes thereof;
    data sets, files and libraries of said communication device; and
    remote device management agent.

10. The communication device according to claim 9, wherein said at least one sensor invokes said fault analysis block to further analyze said suspicious event in case said at least one sensor fails to receive at least part of a test signal sent through said functional path via respective one of said at least one sensor of said communication device.

11. The communication device according to claim 1, wherein said monitoring is of that selected from a list consisting of:
    information residing in an operating system of said communication device;
    communication with said at least one resource;
    executing an operation of said at least one resource and analyzing either one of a response status and output;
    central processing unit (CPU) load;
    accepting a signal to be received within a predefined time interval;
    emulation of a process and analysis of respective responses;
    free memory;
    battery depletion rate;
    data transmission rate;
    data receiving rate;
    correlation between data transmission rate and data receiving rate;
    data integrity;
    code integrity;
    input rate to storage;
    output rate to storage; and
    user interface operability.

12. The communication device according to claim 1, wherein said content is selected from a list consisting of:
    data received from said monitoring of said at least one resource;
    processed data received from said monitoring of said at least one resource;
    filtered data received from said monitoring of said at least one resource; and
    notification of said suspicious event.

13. The communication device according to claim 1, wherein said fault analysis block identifies said suspicious event to be said malfunction according to that selected from a list consisting of:
    predefined criterion;
    predefined pattern; and
    correlation analysis of data received from different ones of said at least one sensor.

14. The communication device according to claim 13, wherein said correlation analysis is performed according to that selected from the list consisting of:
    analysis for predefined states;
    analysis of predefined rules;
    analysis of predefined relationships;
    identification of patterns;
    identification of common causes; and
    identification of root causes.

15. The communication device according to claim 1, wherein said fault analysis block modifies said at least one criterion according to monitored behavior of said communication device.

16. The communication device according to claim 1, wherein said at least one sensor provides said content relating to said suspicious event directly to said recovery block.

17. The communication device according to claim 1, wherein said at least one sensor further includes a WatchDog for registering malfunctions of said processor that result in non-responsiveness of either one of said processor and an operating system of said communication device.

18. The communication device according to claim 17, wherein said WatchDog initiates a remediation activity in case of non-reception of a predetermined periodic signal from said processor.

19. The communication device according to claim 17, wherein said WatchDog continuously receives a live indication via said monitoring by said at least one sensor, of halting of said at least one resource.

20. The communication device according to claim 1, wherein said fault analysis block employs a look-up table to determine whether said suspicious event meets said at least one criterion.

21. The communication device according to claim 1, wherein said auto-diagnosing is initiated by a factor that is external to said communication device.

22. The communication device according to claim 21, wherein said factor is a user of said communication device.

23. The communication device according to claim 1, wherein said performance is of an emergency performance defined by an emergency configuration of said communication device, said emergency performance is selected from the list consisting of:
- voice communication;
- data communication;
- messaging communication; and
- over-the-air (OTA) management.

24. The communication device according to claim 23, wherein said auto-remedial action is selected from the list consisting of:
- restore of a previous configuration of at least one resource involved in said emergency performance; and
- restore of said emergency configuration of said at least one resource that is malfunctioned.

25. The communication device according to claim 1, wherein said recovery block executes at least two said auto-remedial actions of escalating extent.

26. The communication device according to claim 1, wherein said communication device is a cellular telephone.

27. The communication device according to claim 1, wherein said auto-remedial action is selected from the list consisting of:
- reset of at least one functional element of said communication device;
- reset of communication device software;
- reset of communication device hardware;
- reboot of said communication device software gradually;
- reboot entire software of said communication device;
- restore a previous configuration said at least one resource that is malfunctioned;
- restore a previous configuration of all of said at least one resource that malfunctioned;
- restore a previous configuration of all of said at least one resource;
- reinstall at least one application from a local source;
- reinstall at least one application from a remote source;
- reinstall at least one driver from a local source;
- reinstall at least one driver from a remote source;
- reinstall at least part of an operating system from a local source;
- reinstall at least part of an operating system from a remote source;
- reinstall the entire software of said communication device from a local source;
- reinstall the entire software of said communication device from a remote source;
- restore a default configuration as set by the operator of said communication device;
- restore user data that is stored in said communication device; and
- restore user data from a remote backup source.

28. A method for maintaining performance of at least one resource of a communication device that includes a processor, the at least one resource is operatively coupled to at least one sensor, the at least one sensor is coupled to a recovery block, to a fault analysis block and to the processor, the fault analysis block is coupled with the recovery block, the method comprising the procedures of:
- monitoring said at least one resource for information, by said at least one sensor;
- determining whether said information meets at least one criterion of a suspicious event that is indicative of a possible malfunction of said at least one resource;
- auto-diagnosing content relating to said suspicious event by said fault analysis block to determine whether said suspicious event is to be identified as a malfunction event of said at least one resource; and
- initiating at least one auto-remedial action by said recovery block, if said suspicious event is said identified as said malfunction event.

29. The method according to claim 28, wherein said procedure of initiating is with respect to said at least one resource other than that which is possibly malfunctioned.

30. The method according to claim 28, wherein said procedure of initiating at least one auto-remedial action maintains an emergency performance of said communication device, wherein said emergency performance is characterized by having at least one function less, in comparison with that in a regular state of the operation of said communication device.

31. The method according to claim 30, wherein said procedure of initiating said at least one auto-remedial action, substantially maintains said emergency performance of respective one of said at least one resource.

32. The method according to claim 28, further comprising a procedure of sending an alert to at least one predefined external system, by an alert/status handler, upon identification of said suspicious event to be said malfunction.

33. The method according to claim 32, wherein said predefined external system is selected from a management system and a central monitoring device.

34. The method according to claim 28, wherein said at least one criterion of said suspicious event is selected from a list consisting of:
- substantial processor load of said mobile device;
- running of a processor-consuming application on said communication device;
- a predefined pattern compared with monitored behavior characteristics by said at least one sensor;
- a predefined function compared with monitored behavior characteristics by said at least one sensor;
- a particular depletion rate of a battery of said mobile device; and
- a high continuous transmission rate.

35. The method according to claim 28, wherein said at least one resource is selected form a list consisting of:
- hardware of said communication device;
- software of said communication device;
- firmware of said communication device;
- functional element of said communication device;
- functional path of said communication device;
- execution environment and processes thereof;
- data sets, files and libraries of said communication device; and
- remote device management agent.

36. The method according to claim 35, wherein said procedure of auto-diagnosing further comprises a procedure of further analysis of said suspicious event in case said at least one sensor fails to receive at least part of a test signal sent through said functional path, via respective one of said at least one sensor of said communication device.

37. The method according to claim 29, wherein said monitoring is of that selected from a list consisting of:

information residing in an operating system of said communication device;
communication with said at least one resource;
executing an operation of said at least one resource and analyzing either one of a response status and output;
central processing unit (CPU) load;
accepting a signal to be received within a predefined time interval;
emulation of a process and analysis of respective responses;
free memory;
battery depletion rate;
data transmission rate;
data receiving rate;
correlation between data transmission rate and data receiving rate;
data integrity;
code integrity;
input rate to storage;
output rate to storage; and
user interface operability.

38. The method according to claim 29, wherein said content is selected from a list consisting of:
data received from said monitoring of said at least one resource;
processed data received from said monitoring of said at least one resource;
filtered data received from said monitoring of said at least one resource; and
notification of said suspicious event.

39. The method according to claim 29, wherein said procedure of auto-diagnosing said content is according to that selected from a list consisting of:
predefined criterion;
predefined pattern; and
correlation analysis of data received from different ones of said at least one sensor.

40. The method according to claim 39, wherein said correlation analysis is performed according to that selected from the list consisting of:
analysis for predefined states;
analysis of predefined rules;
analysis of predefined relationships;
identification of patterns;
identification of common causes; and
identification of root causes.

41. The method according to claim 29, further comprising a procedure of modifying said at least one criterion according to monitored behavior of said communication device.

42. The method according to claim 29, further comprising a procedure of providing said content relating to said suspicious event by said at least one sensor, directly to said recovery block.

43. The method according to claim 29, further comprising a procedure of registering malfunctions of said processor that result in non-responsiveness of either one of said processor and an operating system of said communication device.

44. The method according to claim 29, further comprising a procedure of initiating a remediation activity in case of non-reception of a predetermined periodic signal from said processor.

45. The method according to claim 29, wherein said procedure of auto-diagnosing determines whether said suspicious event meets said at least one criterion according to a look-up table.

46. The method according to claim 29, further comprising a procedure of continuously receiving a live indication via said monitoring by said at least one sensor, of halting of said at least one resource.

47. The method according to claim 29, wherein said procedure of auto-diagnosing is initiated by a factor that is external to said communication device.

48. The method according to claim 47, wherein said factor is a user of said communication device.

49. The method according to claim 29, wherein said maintaining performance is of an emergency performance defined by an emergency configuration of said communication device, said emergency performance is selected from the list consisting of:
voice communication;
data communication;
messaging communication; and
over-the-air (OTA) management.

50. The method according to claim 49, wherein said auto-remedial action is selected from the list consisting of:
restore of a previous configuration of at least one resource involved in said emergency performance; and
restore of said emergency configuration of said at least one resource that is malfunctioned.

51. The method according to claim 29, wherein said procedure of initiating involves at least two of said at least one auto-remedial actions of escalating extent.

52. The method according to claim 29, wherein said auto-remedial action is selected from the list consisting of:
reset of at least one functional element of said communication device;
reset of communication device software;
reset of communication device hardware;
reboot of said communication device software gradually;
reboot entire software of said communication device;
restore a previous configuration said at least one resource that is malfunctioned;
restore a previous configuration of all of said at least one resource that malfunctioned;
restore a previous configuration of all of said at least one resource;
reinstall at least one application from a local source;
reinstall at least one application from a remote source;
reinstall at least one driver from a local source;
reinstall at least one driver from a remote source;
reinstall at least part of an operating system from a local source;
reinstall at least part of an operating system from a remote source;
reinstall the entire software of said communication device from a local source;
reinstall the entire software of said communication device from a remote source;
restore a default configuration as set by the operator of said communication device;
restore user data that is stored in said communication device; and
restore user data from a remote backup source.

* * * * *